Figure 1:
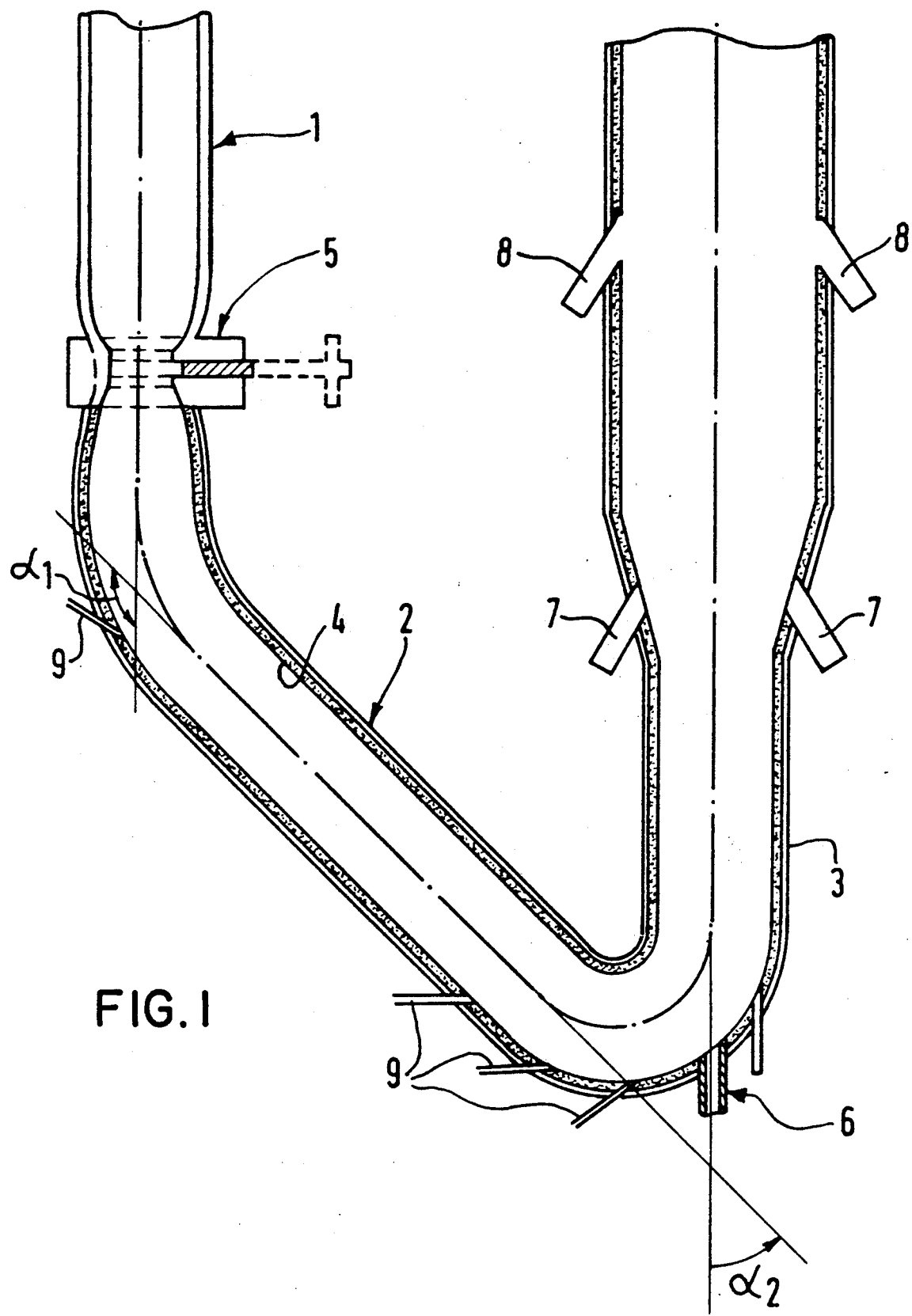

United States Patent [19]

Mauleon et al.

[11] Patent Number: 5,053,203
[45] Date of Patent: Oct. 1, 1991

[54] INSTALLATION FOR THE FLUIDIZED-BED CATALYTIC CRACKING OF A HYDROCARBON FEEDSTOCK

[75] Inventors: Jean-Louis Mauleon, Marly-Le-Roy; Jean-Bernard Sigaud, Vaucresson, both of France

[73] Assignee: Compagnie de Raffinage et de Distribution France, Levallois-Perret, France

[21] Appl. No.: 302,576

[22] Filed: Jan. 26, 1989

[30] Foreign Application Priority Data

Jan. 26, 1988 [FR] France .................. 88 00849

[51] Int. Cl.$^5$ .................. B01J 8/26; F27B 15/06
[52] U.S. Cl. .................. 422/144; 34/57 A; 208/164; 406/14; 406/94; 422/145; 422/241
[58] Field of Search .............. 422/144, 143, 145, 241; 208/164; 406/14, 94; 34/57 R

[56] References Cited

U.S. PATENT DOCUMENTS

| 2,219,011 | 10/1940 | Kidwell et al. | 406/94 X |
| 2,420,129 | 5/1947 | Flock et al. | 406/14 X |
| 2,781,234 | 2/1957 | Boisture et al. | 422/145 X |
| 2,943,994 | 7/1960 | McCain Jr. | 422/145 X |
| 3,692,667 | 9/1972 | McKinney et al. | |
| 3,927,479 | 12/1975 | Stephanoff | 34/57 R |
| 4,331,533 | 6/1982 | Dean et al. | |
| 4,601,814 | 7/1986 | Mauleon et al. | 422/145 X |
| 4,675,099 | 6/1987 | Skraba | |
| 4,728,348 | 3/1988 | Nelson et al. | 422/241 X |

FOREIGN PATENT DOCUMENTS 129621 2/1985 European Pat. Off. .
191695 2/1986 European Pat. Off. .

Primary Examiner—Robert J. Warden
Assistant Examiner—Amalia L. Santiago
Attorney, Agent, or Firm—Curtis, Morris & Safford

[57] ABSTRACT

The invention relates to an installation for the fluidized-bed cracking of a hydrocarbon feedstock.

In accordance with the invention recycling of the regenerated catalyst particles to the intake of the reactor comprise, from upstream to downstream, a preferably substantially vertical pipe (1) for the discharge of the regenerated particles from the regenerator, and a substantially straight pipe (2) connected to the vertical pipe (1) and sloping downward therefrom to the base (3) of the reactor to which it is connected, the downward-sloping pipe (2) being connected to the vertical pipe (1) and to the base (3) of the reactor through inward-curved portions or elbows which impose neither a sharp change in direction on the course of the particles nor sudden changes in the diameter of the pipes.

14 Claims, 2 Drawing Sheets

INSTALLATION FOR THE FLUIDIZED-BED CATALYTIC CRACKING OF A HYDROCARBON FEEDSTOCK

The present invention relates to an installation for the fluidized-bed catalytic cracking of a hydrocarbon feedstock. More particularly, it relates to improvements made to the apparatus commonly used for this purpose with a view to improving the conditions of injection of the regenerated catalyst into the cracking column.

It is known that the petroleum industry routinely employs conversion processes in which hydrocarbon molecules with a high molecular weight and a high boiling point are broken down into smaller molecules which can be distilled in lower temperature ranges suitable for the intended use.

The process most widely used at present for this purpose is the so-called Fluid Catalytic Cracking (FCC) process. In this type of process, the hydrocarbon feedstock is vaporized by being contacted at high temperature with a cracking catalyst that is kept in suspension by the vapors of the feedstock. After the desired range of molecular weights has been obtained by cracking, the catalyst is separated from the products obtained, stripped, reactivated by combustion of the coke formed during the reaction, and then again contacted with the feedstock to be cracked.

In processes of this type, the desired lowering of the boiling points is the result of controlled catalytic and thermal reactions, and the FCC process is, of course, carried out in such a way that the conversion section is in thermal equilibrium. In other words, the intake of hot regenerated catalyst should be such that it will be able to meet the diverse heat requirements of the reaction section, that is, in particular, the preheating of the liquid feedstock,
the vaporization of that feedstock,
the heat input required by the reactions involved, which overall are endothermic, and
the heat losses of the system.

To attain the thermal equilibrium mentioned above as rapidly as possible, it is therefore important not only to inject the feedstock to be cracked finely atomized into the reaction zone at a temperature which may be as high as 400° C. but also to supply the necessary heat by injecting the regenerated catalyst at a higher temperature (which may range from 600 to 950° C.), the heat stored by the catalyst particles resulting from the combustion of the coke deposited thereon during the cracking reaction. Reference may be had, for example, to European patent 191,695, applied for by the Applicants' Assignee, and incorporated herein (as needed) see equivalent U.S. Pat. No. 4,832,3825, issued May 23, 1989.

Such a process is usually carried out in an installation comprising a tubular reactor, known as a riser, which is supplied at its base with regenerated catalyst particles in a controllable quantity.

The catalyst is propelled in a dilute homogeneous phase into the tubular reactor by the injection through a diffuser of steam or of a light hydrocarbon. The diffuser is located at the base of the reactor, below the regenerated-catalyst supply line.

The feedstock to be cracked is introduced at a higher level of the reactor through an injector or an array of injectors.

The reaction column opens at its top into a chamber which may be concentric with it, for example, and in which the gaseous effluents and the catalyst are separated by means of a ballistic separator and the spent catalyst is stripped. The reaction products are freed from all entrained catalyst in a cyclone system, which may be accommodated in the chamber and at the top of which a discharge line for the effluents is provided, while the collected particles of spent catalyst are reinjected at the bottom of the chamber. A stripping gas, usually steam, is fed through a line to a diffuser located at the bottom of the chamber.

The particles of spent catalyst so stripped are discharged at the bottom of the chamber to a regenerator with one or two combustion chambers.

In the regenerator, the catalyst particles are maintained in a fluidized bed by means of an oxidizing fluid which assures the combustion of the coke deposited on the catalyst.

The hot regenerated catalyst particles are then discharged from the regenerator to the base of the cracking column, where they are reinjected for a new cycle.

The circulation of the catalyst between the cracking column and the regenerator is brought about by the differences in pressure and level between these vessels and by the streams of gaseous fluids injected for the operation of the process.

Connecting the regenerator to the reaction column for the purpose of recycling the regenerated catalyst has always been a crucial factor in the design of catalytic cracking units. The catalyst must not, in fact, remain at the base of the reactor but should on the contrary stabilize and rehomogenize rapidly in a fluidized phase. Widely differing geometric forms have therefore been proposed for the pipes in which the catalyst is transferred. However, the solutions conceived have generally been dictated more by mechanical considerations than by an endeavor to optimize the cracking process. In fact, the requirements imposed by the metallurgy of the pipes have made it necessary for many years to work with a hot outer wall, with attendant problems of expansion calling for the use of expansion joints of the type generally referred to as vented, which interfere with the circulation of the catalyst particles, or the selection of special coupling sections which make it possible avoid or limit the use of expansion joints.

U-shaped sections have therefore been proposed as coupling sections between a reactor and a regenerator disposed on the same level. However, it is difficult to control the circulation of the catalyst and avoid the formation of slopes in the lower portions, and particularly at the bottom of the U-shaped, where the catalyst tends to accumulate, which necessitates the injection of a booster fluid. If the latter is air, it will pose safety problems in the reactor. If it is steam, it will have an adverse effect on the stability of the catalyst, especially if it is at an elevated temperature. And if inert gases are used, they will give rise to problems of control of the unit, particularly on the level of the dry-gas compressor.

J circulation sections therefore have also been proposed, with the regenerator at a lower level than the top of the cracking column, and vertical pipes for the discharge from the regenerator of the regenerated catalyst and for its introduction into the reactor vessel, these two pipes being connected to each other through a third pipe having an ascending slope of about 60 degrees which forms the base of the J. This section also requires the injection of a sizable quantity of lifting gas in the ascending portion. Moreover, the time of contact of this gas with the hot catalyst is relatively long, being over three seconds. Furthermore, it requires that the feedstock be injected into the column at a level that is higher than the upper end of the ascending portion of the circuit. This is detrimental to optimum atomization of the feedstock, which requires as high an injection pressure as possible.

Moreover, in a large number of cracking units now in service, a so-called Y circuit connecting the regenerator to the riser is used. (See the aforesaid European patent 191,695.) The discharge pipe of the regenerator is essentially vertical and is connected to a pipe which is inclined about 140 to 150 degrees and which in turn is connected at an angle to the lower portion of the vertical riser; hence the name "Y section". Strong reinforcing members must be provided at the level of the connection to the tubular reactor to assure sufficient rigidity, and special steels must be used with a view to compensating expansion. This type of section has in addition the following drawbacks:

Due to the use of a usually vented expansion joint in the inclined pipe, the catalyst suspension may become partially defluidized, with gas collecting in the upper portion of the section, which may result in leakage and loss of static pressure.

The slide-gate valve controlling the flow rate is located downstream of the expansion joint and operates in an inclined position, which creates problems of wear and flexibility for the valve body.

The angular connection between the inclined pipe and the vertical reaction column makes it necessary for these two components to have different diameters, with the column requiring a larger cross section, which is detrimental to the control of the velocities to be observed.

The angular connection further forces the catalyst to undergo a sudden change of direction, which renders its rehomogenization in an upward flow before being mixed with the feedstock very difficult and entails the risk of erosion of the lower portion of the connection.

These drawbacks of prior-art installations are largely due to the stresses set up by the expansion of the pipes used, which are in direct contact with the stream of high-temperature catalyst. The walls of these pipes, known as hot-wall pipes, therefore are of considerable thickness, which militates against their being subjected to pronounced bending.

The present invention seeks to overcome these drawbacks by employing a different technology in which the skin (surface) temperatures of the pipes connecting the regenerator to the riser is held close to ambient temperature, that is, to a temperature which preferably does not exceed 150° C., through an inner cladding of these pipes in the form of a layer of an abrasion-resistant heat-insulating refractory material.

Through the use of this cold-wall technology, the invention further seeks to reduce the wall thickness of the pipes connecting the regenerator and the riser and thus to permit their being bent into shapes different from those of the prior art which promote the movement of the regenerated catalyst particles without loss of velocity and without a pressure drop.

The invention also seeks to dispense with the use of expansion joints in the pipes connecting the regenerator and the riser by using these cold-wall pipes.

A further aim of the invention is to permit locating the valve or valves for the control of the stream of regenerated catalyst particles in a vertical pipe of the circuit used for these particles while keeping that valve as close as possible to the injection zone at the base of the riser.

The invention further seeks to permit the use of a transfer pipe for the regenerated catalyst whose diameter is the same as that of the reaction column.

A final aim of the invention is to permit the connection of that pipe to the reaction column to have a curved shape favoring rehomogenization of the catalyst and preventing attrition of the particles.

To this end, the invention has as one element an installation for the fluidized-bed cracking of a hydrocarbon feedstock, said installation comprising an essentially vertical, upflow tubular type of reactor; means for injection into the reactor of the feedstock to be cracked; means for introduction at the base of the reactor of at least one gas capable of maintaining the catalyst particles in a fluidized bed; means in the upper portion of the reactor for the ballistic separation of the spent catalyst particles and the cracked hydrocarbons; means for regeneration of the spent particles by combustion of the coke deposited thereon; means for conducting the spent particles from the reactor to the regeneration means; and means for recycling the regenerated particles from the regeneration means or from an auxiliary buffer chamber to the base of the reactor, said installation being characterized in that the means for recycling the regenerated catalyst particles to the intake of the reactor comprise, from upstream to downstream, a preferably substantially vertical pipe for the discharge of the regenerated particles from the regeneration means, and a substantially straight pipe connected to the vertical pipe and sloping downward therefrom to the base of the reactor to which it is connected, the downwardsloping pipe being connected to the vertical pipe and to the base of the tubular reactor through inward-curved portions or elbows which impose neither a sharp change in direction on the course of the particles nor sudden changes in the diameter of the pipes.

Advantageously, the angles made by the axis of the downward-sloping pipe with the axis of the vertical pipe where they connect, and by the axis of the downward-sloping pipe with the axis of the base of the tubular reactor, range from 150 to 120 degrees and from 30 to 60 degrees, respectively. In a preferred embodiment, these angles are about 135 degrees and about 45 degrees, respectively.

The curved portion or elbow connecting the downwardsloping pipe to the base of the tubular reactor preferably has a diameter substantially equal to that of the base portion to which it is connected, and the injection of a lifting gas is preferably effected tangentially to the lower portion of that elbow and of the elbow connected to the vertical pipe so as to facilitate maintaining the catalyst in a fluidized phase and to impart to it a gradual and uniform acceleration before it is contacted with the feedstock to be cracked in the reaction zone.

This configuration makes possible catalyst circulation velocities at the base of the reactor exceeding those of the prior art, where they generally range from 0.6 to 1.2 meters/second. Because of the arrangement in accordance with the invention, this velocity may range from 0.6 to 3 meters/second, and advantageously from 1.2 to 3 meters/second. This velocity range is particularly advantageous for passing to the ascending regime known as "fast fluidization" of the catalyst in the reaction zone, this regime being established for a range of superficial velocities of from 1.0 to 6 meters/second.

The pipes in accordance with the invention may, of course, be made of any suitable material; however, in a preferred embodiment of the invention they comprise a metallic wall that is internally clad with a layer of a heat-insulating material of such thickness that the skin temperature of the pipe is close to ambient temperature. It will thus be possible to reduce the wall thickness of the pipes and to bend them without difficulty for curving them to the shapes desired in the elbows. It will also be possible to connect the downward-sloping pipe to the base of the tubular reactor without any sudden change in diameter.

The metal or alloy of which these pipes are made may be a simple carbon steel that is less expensive than the special steels and is easy to bend, to shape or to weld. The heat-insulating material with which the pipe is clad may be an abrasion-resistant refractory material. It is preferably applied as a single layer by the cast/vibrated technique and usually is held in place simply through the arch effect without requiring special anchoring means on the pipe.

A first advantage of the installation in accordance with the invention is that it makes it possible to dispense with expansion joints in the pipes supplying the reactor with regenerated catalyst.

Another advantage is that the valve, which serves for the control of the flow rate of the regenerated catalyst and generally is of the sliding-gate type, can be installed in the vertical position. It is preferably located in the lower portion of the vertical pipe for the discharge of regenerated catalyst from the regenerator or from an auxiliary buffer chamber. Like the pipes used in accordance with the invention, the valve will also be of cold-wall construction, that is, made of steel or of another alloy or metal and internally clad with a heat-insulating refractory material, with only the internal components of the valve, such as the sliding gate, then having to be in direct contact with the hot catalyst and being made of stainless steel or fabricated from surface-treated and heatresistant steels. The thermal stresses to which this control valve is subjected thus being greatly reduced, the temperature limits on the regenerated catalyst can be raised, the valves being used continuously at 900° C. instead of about 785° C. as in the prior art.

A further advantage of the invention stems from the fact that the internal components of the valve may be made continuous with the diameter of the pipe in which it is installed, by providing refractory transition cones with precisely specified angles to maintain and assure good fluidization of the catalyst.

As has been pointed out, injections of a supplementary lifting gas may be used to accelerate the catalyst particles at the level of the elbow connecting the downward-sloping pipe to the tubular reactor. An air cushion may thus be created at the level of the lower circumference of these elbows by means of minimal quantities of gas, and steam in particular may be used to this end as fluidizing gas without major risk of deactivation of the catalyst even if it is very hot. The air cushion may be produced conventionally by means of a diffuser of the perforated-plate type or with slots below which an air inlet is located. The diffusers may also consist of simple tubes entering and cut flush with the heatinsulating material and judiciously placed, for example, in a staggered arrangement.

The density of the catalyst in the pipes 1 and 2 can then be increased to at least 640 kg/m$^3$.

This arrangement of the invention is of particular interest in the case of a modernization of an old catalytic cracking installation, where the feedstock injection pressure usually is low and difficult to change without complete modification of the feedstock preheating circuit.

FIG. 1 is a diagrammatic drawing in a fragmentary vertical section through an installation in accordance with the invention for the fluidized-bed catalytic cracking of hydrocarbon feedstock.

Figure 2:
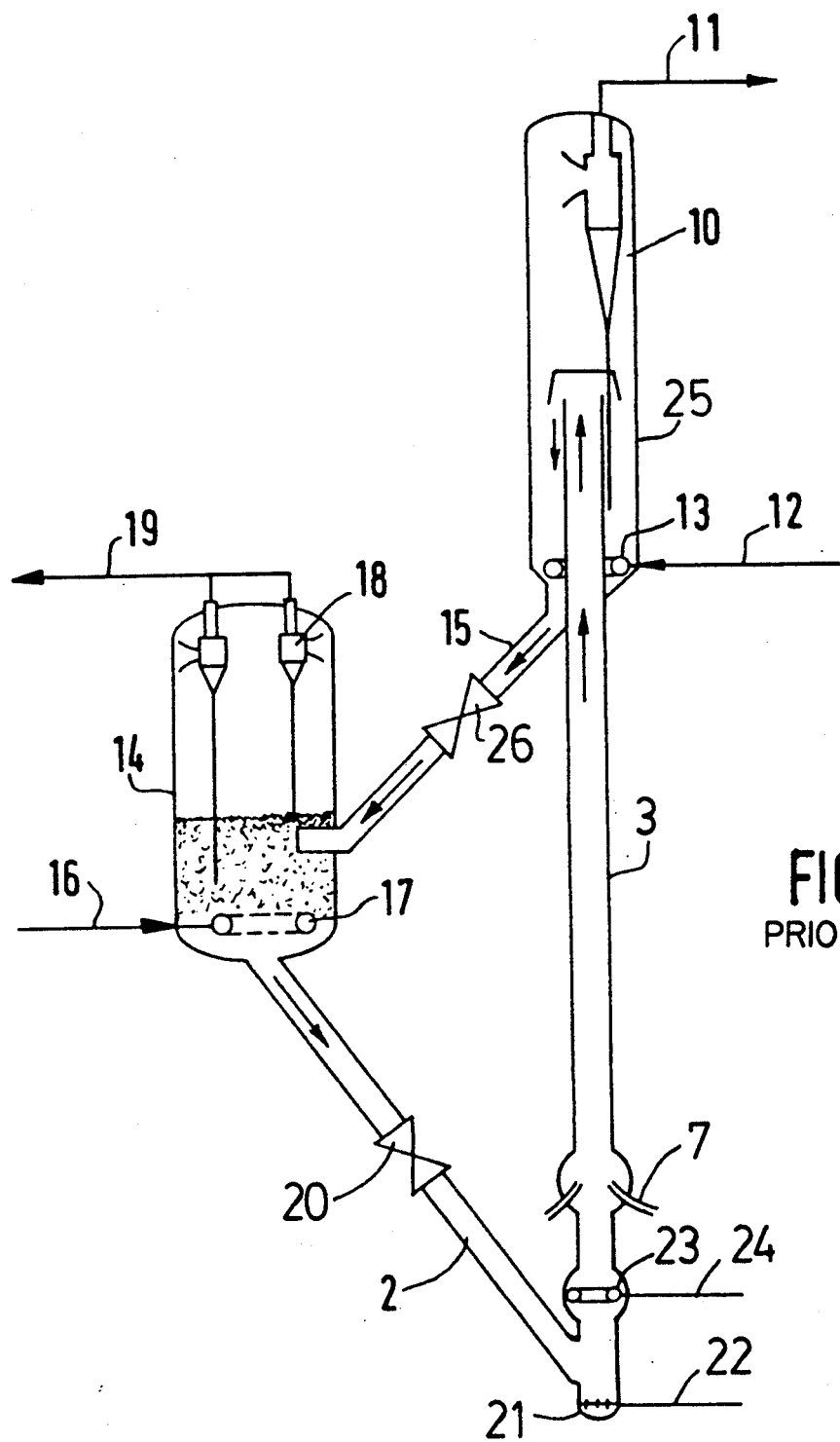

FIG. 2 a diagrammatic drawing of apparatus according to U.S. Pat. No. 4,832,325, of the type into which the present invention (with appropriate modification) can be incorporated.

As may be seen from that drawing, the regenerated catalyst particles are discharged from the regenerator, not shown, through a vertical pipe 1 which is connected to a pipe 2 whose descending axis here is inclined about 135 degrees relative to the axis of pipe 1 and which is connected directly to the base of a tubular vertical feedstock elevator or riser 3. The elbows connecting the inclined pipe 2 to pipe 1 and to the base of the riser 3 have an inwardly curved shape without any sharp edges, and pipe 2 is connected to the riser 3 without any discontinuity in diameter. Thus, the elbow which has the angle $a_2$ forms a continuous curved passage into the bottom of the reactor with the downstream upwardly curved portion of the elbow defining the base of the reactor as shown in the drawing and contains the injector 6. Pipe 2 should be as short as possible, but the length of the downwardly sloping transfer pipe is substantially greater than the length of the upwardly curved portion of the elbow with angle $a_2$. In the present case the length of the pipe 2 is about four times the diameter of the pipe. The angle $a_1$ which the axis of the vertical pipe 1 makes with the axis of the downward-sloping pipe 2 is about 135 degrees, while the angle $a_2$ which the axis of the downward-sloping pipe 2 makes with the axis of the riser is of the order of 45 degrees.

The pipes 1 and 2 and the riser 3 are internally clad with a layer 4 of a heat-insulating refractory material which assures that the pipe will have a skin temperature close to ambient temperature and makes it possible to reduce the wall thickness of the pipes and to use only relatively common metals or alloys such as carbon steel. The pipes can thus be readily bent to obtain the inwardly curved connecting shapes characteristic of the invention.

A valve 5 for the control of the flow rate of the regenerated catalyst is disposed in the lower portion of the vertical pipe 1. Thus a slide-gate valve whose body is symmetrically supported on the guides can be used without problems of wear or flexibility of the valve body. Like the other components of the installation, the valve 5 is internally clad with a heat-insulating refractory material.

It should be noted that it is not necessary to use expansion joints in the pipes, which eliminates the problems inherent in that type of joint.

As usual, a line 6 here feeds stream to a diffuser (not shown) disposed at the base of the riser 3, upstream of the injectors for the feedstock to be cracked for propelling the regenerated catalyst in the form of a homogeneous dilute phase into the reactor. Recycled products may further be introduced into the reactor by means of injectors 8, located downstream of the injectors 7, as described, for example, in Applicants' Assigne's French patent application 2,584,732 equivalent to U.S. Pat. No.

4,818,372, issued Apr. 4, 1989 which is also incorporated herein by reference. The feedstock injectors 7 are located at as low a level as possible in the reactor 33, below the level of the slide-gate valve 5, and preferably at a distance from the elbow which connects pipe 2 of from about 1.5 to 5 times, and preferably from 2 to 4 times, the diameter of that pipe.

It is, of course, necessary to prevent defluidization of the suspension of regenerated catalyst in pipe 2 and at the level of the elbow connecting that pipe and the base 3 of the riser, which would have the effect of causing the lifting gas to collect in the upper portion of these components, with the catalyst particles depositing in the lower portions thereof. Too this end, gas injectors 9 are provided for injecting preferably tangentially a booster fluid such as steam at the level of the elbows connecting pipe 2 to the base 3 of the riser and to pipe 1. This booster gas imparts to the catalyst particles a gradual and uniform acceleration, thus contributing to their being maintained in a fluidized state. Moreover, the injected gas forms an air cushion along the lower circumference of pipe 2 and of the elbows and prevents any local accumulation of particles. With a view to obtaining homogenization of the fluidized phase, the orifices of the injectors 9 are advantageously staggered on the inner surface of the refractory cladding 4.

As pointed out above, it is thus possible to inject the catalyst particles at the base 3 of the riser at velocities ranging from 0.6 to 3 meters/second, and more particularly from 1.2 to 3 meters/second, in other words, at velocities exceeding the usual velocities in the prior art. This will promote passing to the ascenting regime known as fast fluidization in the reaction zone. Such a regime, established by velicities of the order of from 1 to 6 meters/second, has the following characteristics:

A quasi-continuous gas phase with few bubbles, if any.

The formation of very unstable aggregates of catalyst particles, the appearance of blind zones thus being avoided even along the walls, where practically no stagnant boundary layer will form or even none at all.

The setting up of vigorous mixing within the fluidized bed when the feedstock is injected, which results in optimum heat exchange conducive to very rapid vaporization over a very short path of the injected liquid feedstock, permitting strict control of the final reaction temperature to less than ±1.5 C. of a desired temperature.

The installation in accordance with the invention thus assures a smooth flow of catalyst, consequently eliminating or limiting the risks of catalyst attrition.

FIG. 2 is a diagram of a catalytic cracking apparatus equipped with a fluid introduction system and having a single-stage catalyst regeneration chamber. This is an apparatus for cracking by the FCC process disclosed in U.S. Pat. No. 4,832,825. The apparatus essentially comprises a column 3, known as feedstock elevator or riser, which is fed at its base through the line 2, with regenerated catalyst particles in an amount determined by the opening or closing of a valve 20. The temperature and the density of this regenerated catalyst are rendered uniform by injection at the base of the riser, by means of a first diffuser 21, of a first gaseous fluid introduced through the line 22.

The catalyst so arrayed and maintained in a homogenous dense phase fluidized bed is then lifted up homogeneously into the riser by a new injection by means of a second diffuser 23, located above the regenerated catalyst intake in the riser, of a second gaseous fluid which may or may not be the same as the first one and which is introduced through the line 24. The feedstock to be cracked is then introduced into the riser by means of an injector 7.

The column 3 terminates at its top in a vessel 25 which may, for example, be concentric with it and in which the cracked feedstock is separated and the spent catalyst is stripped. The treated feedstock is separated in a cyclone system 10 which is accommodated in the vessel 25, at the top of which a discharge line 11 is provided for the cracked feedstock, while the spent catalyst particles carried over are reinjected at the base of the vessel 25. A line 12 feeds stripping gas, usually steam, to injectors 13 that are uniformly disposed at the base of the vessel 25.

The spent catalyst particles so stripped are discharged at the base of the vessel 25 to a regenerator 14 through a conduit 15 in which a control valve 26 is inserted. In the regenerator 14, the coke deposited on the catalyst particles is burned off by the use of oxygen-rich gas such as air injected at the base of the regenerator through a line 16 that feeds evenly spaced injectors 17. The entrained catalyst particles and the combustion gas are separated by cyclones 18, from which the combustion gas is exhausted through a line 19 while the regenerated catalyst particles drop to the base of the regenerator, from where they are recycled to the line 2, equipped with a control valve 20, to the intake of the elevator or riser 3.

We claim:

1. Apparatus for the fluidized-bed cracking of a hydrocarbon feedstock, comprising an essentially vertical, upflow tubular type of reactor having a bottom portion with a base and an upper portion; means for injecting into the reactor the feedstock to be cracked; means for introduction at the base of the reactor at least one gas capable of maintaining the catalyst particles in a fluidized bed condition; means in the upper portion of the reactor for the ballistic separation of spent catalyst particles and cracked hydrocarbons; means for regeneration of the spent particles by combustion of the coke deposited thereon; means for conducting the spent particles from the reactor to the regeneration means; and means for recycling the regenerated particles from the regeneration means to the base of the reactor, the means for recycling the regenerated catalyst particles to the base of the reactor being metallic piping free of expansion joints and internally provided with an abrasion-resistant heat-insulating refractory liner, such recycling means comprising, from upstream to downstream, a substantially vertical pipe connected to said regeneration means for receiving the discharge of the regenerated particles from the regeneration means, and a substantially straight transfer pipe connected to the vertical pipe at an obtuse angle $a_1$ measured from the substantially vertical pipe and sloping downwardly therefrom to the bottom of the reactor to which it is connected at an acute angle $a_2$ measured from the longitudinal axis of said reactor, the downwardly-sloping transfer pipe being respectively connected to the vertical pipe and to the bottom of the reactor through curved portions defining elbows at said angles $a_1$ and $a_2$ respectively, the elbow which has the angle $a_2$ forming a continuous curved passage into the bottom of said reactor with the downstream upwardly curved portion of said elbow defining said base of said reactor and containing said means for injection, the length of said downwardly sloping transfer pipe being substantially greater than the length of the upwardly curved portion of said elbow having the angle $a_2$, and the downwardly-sloping transfer pipe and the elbow connecting such transfer pipe to the base of the reactor each having a cross-sectional diameter substantially equal to that of the reactor base to which the elbow is connected.

2. Apparatus as defined in claim 1, wherein the angles made by the connection of axis of the downwardly sloping pipe with the axis of the recycle means vertical pipe and by the axis of the downwardly-sloping pipe with the vertical axis of the base of the tubular reactor, range from 150 to 120 degrees and from 30 to 60 degrees, respectively.

3. Apparatus as defined in claim 2, wherein the angles of connection made by the axis of the downwardly sloping pipe with the axis of the recycle means vertical pipe, and by the axis of the downwardly-sloping pipe with the vertical pipe of the base of the tubular reactor, are about 135 degrees and 45 degrees, respectively.

4. Apparatus as defined in claim 1, further comprising at least one injector for a supplementary gas discharging tangentially along the lower internal periphery of the elbow having the angle.

5. Apparatus as defined in claim 1, further comprising at least one injector for a supplementary gas discharging tangentially along the lower peripheral curvature of the elbow having the angle $a_2$.

6. Apparatus as defined in claim 4, wherein the orifices of each of said at least one injector are staggered with respect too each other in the interior of said connecting elbow.

7. Apparatus as defined in claim 5, wherein the orifices of each of said at least one injector are staggered with respect to each other in the interior of said connecting elbow.

8. Apparatus as defined inn claim 1, further comprising at least one sliding-gate valve for the control of the flow rate of the regenerated catalyst, wherein said valve is disposed in the lower portion of the vertical pipe of the recycling means.

9. Apparatus as defined in claim 1, wherein the outer metallic walls of the of the recycling means vertical pipe, of the downwardly-sloping pipe and of the elbows connecting these pipes to each other and to the bottom of the reactor, are made of carbon steel.

10. Apparatus as defined in claim 1, wherein the layer of a heat-insulating material which internally clads said outer metallic wall is the result of an application of a single layer by the cast/vibrated technique.

11. Apparatus as defined in claim 10, wherein the layer of heat-insulating material is held in place through the arch geometry without other anchoring means.

12. Apparatus as defined in claim 8, wherein the means for injection into the tubular reactor of the feedstock to be cracked are disposed at a lower level than the slide-gate valve and at a distance from the elbow having the angle $a_2$ of from 1.5 to 5 times the diameter of said downwardly-sloping pipe.

13. Apparatus as defined in claim 8, wherein the means for injection into the tubular reactor of the feedstock to be cracked are disposed at a lower level than the slide-gate valve and at a distance from the elbow having the angle $a_2$ of from 2 to 4 times the diameter of said downwardly-sloping pipe.

14. Apparatus as defined in claim 2, further comprising at least one injector for a supplementary gas discharging tangentially along the lower peripheral curve of the elbow having the angle $a_1$; further comprising at least one injector for a supplementary gas discharging tangentially along the lower peripheral curvature of the elbow having the angle $a_2$, wherein the vertical pipe and the downwardly-sloping pipe, and the elbows connecting these pipes to each other and to the bottom of the reactor, have a metallic outer wall that is clad internally with at least one layer of a heat-insulating material; wherein the means for injection into the tubular reactor of the feedstock to be cracked are disposed at a lower level than the slide-gate valve and at a distance from the elbow having the angle $a_2$ of from 1.5 to 5 times the diameter of said downwardly-sloping pipe, and wherein the length of the downwardly-sloping pipe is about four times the diameter of said downwardly-sloping pipe.

* * * * *